(12) United States Patent
Lang (10) Patent No.: US 6,749,249 B1
(45) Date of Patent: Jun. 15, 2004

(54) PICKUP TRUCK CAP LIFT SYSTEM

(76) Inventor: William T Lang, 1893 W. Harding Way, Stockton, CA (US) 95203

( * ) Notice: Subject to any disclaimer, the term of this patent is extended or adjusted under 35 U.S.C. 154(b) by 0 days.

(21) Appl. No.: 10/361,932

(22) Filed: Feb. 10, 2003

(51) Int. Cl.[7] .................................................. B60P 7/02
(52) U.S. Cl. .................................................. 296/100.1
(58) Field of Search ............................... 296/165, 167, 296/169, 172, 173, 176, 175, 26.06, 26.07, 100.06, 100.08, 100.1

(56) References Cited

U.S. PATENT DOCUMENTS 4,261,611 A * 4/1981 Barry et al. ............. 296/100.1
5,944,376 A * 8/1999 Buchanan, Jr. .......... 296/100.1
6,543,834 B2 * 4/2003 Sisson .................... 296/100.1

* cited by examiner

Primary Examiner—Jason Morrow
(74) Attorney, Agent, or Firm—Michael I Kroll (57) ABSTRACT

The present invention includes an electrically driven screw lift device for pivotally lifting a pickup truck cap or camper shell 14. As used, a standard camper shell 14 is mounted to the bed 16 of a pickup truck 12 and the shell 14 is hinged at 34 on the driver's side of the truck 12. A 12-volt screw linear actuator 20 is mounted to the pickup truck 12 and to the camper shell 14 and provides positive lift and retraction when activated. The actuator 20 lifts the complete camper shell on the hinges 34 making the pickup truck bed 16 accessible from the passenger side of the bed.

9 Claims, 7 Drawing Sheets

FIG. 7

PICKUP TRUCK CAP LIFT SYSTEM

BACKGROUND OF THE INVENTION

1. Field of the Invention

The present invention relates generally to devices used to lift pickup truck caps and, more specifically, to an electrically driven screw lift device that provides means for pivotally lifting a pickup truck cap or camper shell. A standard camper shell is mounted to the bed of a pickup truck and the shell is hinged on one side of the truck. Before lifting the hold down fasteners are released from the cap and a 12 volt screw linear actuator mounted to the pickup truck and to the camper shell provides positive lift and retraction when activated. The actuator pivotally lifts the hinged camper shell making the pickup truck bed accessible. When not in use, the hold down fasteners are locked in the down position.

An advantage to side access is the side loading of materials such as sand, gravel, soil and other loose materials that can be dumped into the side access by other vehicles such as bobcats, bulldozers, backhoes and so on. Other advantages include the maneuvering of large articles into the bed without a height restriction imposed by the camper shell and may be left up due to the screw drive which prevents further movement of the camper shell either up or down.

2. Description of the Prior Art

There are other pickup truck cap lift systems designed for this purpose. Typical of these is U.S. Pat. No. 2,886,375 issued to Crawford on May 12, 1959.

Another patent was issued to Moe et al. on Apr. 11, 1989 as U.S. Pat. No. 4,819,981. Yet another U.S. Pat. No. 5,094,499 was issued to Simone on Mar. 10, 1992 and still yet another was issued on Apr. 7, 1992 to Lake as U.S. Pat. No. 5,102,185.

Another patent was issued to Heinz on Jul. 21, 1992 as U.S. Pat. No. 5,131,712. Yet another U.S. Pat. No. 5,403,061 was issued to Micknowicz on Apr. 4, 1995. Another was issued to Miller on Apr. 2, 1996 as U.S. Pat. No. 5,503,450 and still yet another was issued on Jun. 8, 1999 to Nesbeth as U.S. Pat. No. 5,909,921.

Another patent was issued to Billiu et al. on Apr. 3, 2001 as U.S. Pat. No. 6,209,944. Yet another U.S. Pat. No. 6,343,828 was issued to Young, et al. on February 2002.

U.S. Pat. No. 2,886,375

Inventor: Daniel W. Crawford

Issued: May 12, 1959

The present invention relates to the general art of automotive bodies, and more particularly to a detachable body intended for employment on the lighter trucks, such as the pickup truck and which because of its peculiar arrangement can be easily opened from either side or may be quickly removed for loading or unloading of the vehicle and then replaced and be clamped into operational position.

U.S. Pat. No. 4,819,981

Inventor: Gilmore L. Moe et al.

Issued: Apr. 11, 1989

A cap is provided for disposition over the load bed of a pickup truck and includes opposite sidewall structures having lower marginal portions for close juxtaposed position relative to upper marginal portions of the sidewalls of the load bed. Each side wall structure and the corresponding side wall include longitudinally spaced vertically separable mounting portions supporting the side wall structure from the side wall for angular displacement relative thereto about an axis extending along the lower marginal portion of that side wall structure. In addition, each pair of mounting portions includes support and guide means interconnecting therebetween operative to guide the corresponding side wall structure relative to the corresponding side wall for up and down movement relative thereto between a lowered position juxtaposed position the side wall and an upper limit position, the support and guide structure including spring means yieldingly biasing the side wall structure toward its upper limit position. Also, each pair of mounting portions includes latch structure for releasably latching each side wall structure mounting portion against upward displacement relative to the corresponding side wall mounting portion.

U.S. Pat. No. 5,094,499

Inventor: Anthony L. Simone Jr.

Issued: Mar. 10, 1992

A raising and lowering mechanism including an electric powered winch having a cable connected to the cross bar of pivotal lever arms to raise and lower a pivotally hinged rigid cover. The winch cable is payed over a pulley system positioned at a height equal to or greater than the pivot points of the lever arms for providing a mechanical advantage.

U.S. Pat. No. 5,102,185

Inventor: William H. R. Lake

Issued: Apr. 7, 1992

A lift-roof cover 10 for a light truck open load bed 12, comprising a lift-roof structure 15 pivotally attached about a lateral axis A-A to the upper edge 44 of the cover forward wall 18, the forward wall 18 being fixedly mounted to the load bed 12 so that, alternately, secure weatherproof enclosure of the load bed 12 may be provided with the lift-roof structure 15 in a lowered position, or the lift-roof structure 15 may be raised at the rear about the lateral axis A-A, providing improved access to the load bed 12. A preferred embodiment incorporates the use of compression struts 74, 76 to provide lift assist in raising the lift-roof structure 15 and accommodates the application of flexible curtains 146 to provide full enclosure with the lift-roof structure 15 in a raised position, while maintaining commonality with methods of manufacture, handling, shipping and storage employed for high volume production load bed covers of the prior art.

U.S. Pat. No. 5,131,712

Inventor: David S. Heinz

Issued: Jul. 21, 1992

The specification discloses a device for tilting a truck box cover to an angular position thus providing improved access to the cargo area. The box cover is mounted to the side of the truck box by a hinge. The box cover is assisted in lifting to an open position and held open by an actuator which may be a single gas spring or a screw powered by an electric motor.

The actuator is positioned near the front of the truck box so it causes minimum obstruction of the cargo space. The device may be used with conventional truck box covers. The box cover can be stabilized in a non-closed position by a steady strut. A restraint prevents over-opening of the box cover. A strong frame prevents excessive deflections of the box cover and enables the use of one actuator.

U.S. Pat. No. 5,403,061

Inventor: John J. Micknowicz

Issued: Apr. 4, 1995

The invention relates to a cap for pickup truck cargo bodies that is secured in place by hinges and may be tilted by removing the hinge pins on one side and removed by removing the hinge pins from both sides. Rods are provided which engage the hinge cylinder on the body and on the cap and thereby secure and support the cap from dynamic forces that might otherwise cause the cap to lift or drop.

U.S. Pat. No. 5,503,450

Inventor: Aden L. Miller

Issued: Apr. 2, 1996

A lid lift system wherein a lift piston is mounted within a wheeled vehicle bed to actuate a lift member which will slidingly move along a slide rail track to open and close a lid upon the wheeled vehicle bed. Furthermore, the lift piston can either be activated by a toggle switch located in the truck cab or by a remote control. Additionally, the lid lift system is configured such that it can either be factory installed or installed by a customer.

U.S. Pat. No. 5,909,921

Inventor: Roleto E. Nesbeth

Issued: Jun. 8, 1999

A lift device for a cargo cover installed on a pickup truck. The lift device includes a first member, a second member, a first expansion device, and a second expansion device. The first member is mounted in the bed of a pickup truck. The second member has a first end and a second end, with the first end pivotally-connected to the first member. The first expansion device has a first end connected to the first member and has a second end connected to the second member. The second expansion device has a first end connected to the second end of the second member and has a second end for connection to the cargo cover.

Issued: Jun. 8, 1999

A stowable top or cover mounted on an open bed of a truck, such as a pickup truck, using lift frames and actuators in a manner to be raised above the bed. The cover and lift frames include attachment channels for connecting a flexible tent-like enclosure thereto such that the enclosure can be attached thereto after the cover is raised. The flexible enclosure can comprise a camper enclosure that encloses the truck bed and also optionally can extend beyond the truck bed to form additional sitting and sleeping rooms supported on separate portable tent-type posts and platforms. A flexible awning enclosure can be attached to the raised cover and lift frames to form an awning that extends beyond the truck bed supported on separate tent-type posts to provide a covered area for on-site work/commercial/recreational activities. An office enclosure can be attached to the raised cover and lift frames to form an office or meeting room where job-site work/meetings and the like can be conducted protected from the weather.

U.S. Pat. No. 6,343,828

Inventor: David C. Young et al.

Issued: Feb. 5, 2002

A truck lid hinge and opener system for removably connecting a lid or cover to the bed of a truck wherein the bed includes a vertical front wall, first and second vertical side walls extending rearwardly from the front wall, and a tailgate at the rearward end of the bed with the side walls having downwardly extending flanges at the upper end thereof. A pair of hinge units removably hingedly connect the forward end of the lid to the truck bed. A pair of like opener mechanisms pivotally interconnect the sides of the lid to the side walls of the truck bed. Each of the open mechanisms includes a gas spring which is adjustably mounted to compensate for varying temperature conditions. The hinge units and opener mechanisms are clamped onto the truck bed to avoid drilling holes in the truck bed.

While these camper shell lift devices may be suitable for the purposes for which they were designed, they would not be as suitable for the purposes of the present invention, as hereinafter described.

The present invention is an electrically driven screw lift device that provides means for pivotally lifting a pickup truck cap or camper shell. A standard camper shell is mounted to the bed of a pickup truck and the shell is hinged on one side of the truck. Before use, the hold down fasteners mounted to the truck and cap are released and a 12-volt screw linear actuator mounted to the pickup truck and to the camper shell is energized providing positive lift and retraction when activated. The actuator pivotally lifts one side of the camper shell on the hinges making the pickup truck bed accessible. When not in use, the hold down fasteners are locked in the down position.

SUMMARY OF THE PRESENT INVENTION

The present invention discloses an electrically driven screw lift device which provides means for pivotally lifting a pickup truck cap or camper shell. As used, a standard camper shell is mounted to the bed of a pickup truck and the shell is hinged on the driver's side of the truck. A 12-volt screw linear actuator is mounted to the pickup truck and to the camper shell and provides positive lift and retraction when activated. The actuator lifts the complete camper shell on the hinges making the pickup truck bed accessible from the passenger side of the bed. An advantage to side access is side loading of materials such as sand, gravel, soil and other loose materials that can be dumped into the side access by other vehicles. Other advantages include the ability to maneuver large articles into the bed without causing a height problem, due to increased standing room so that the articles may be safely driven to their destination.

A primary object of the present invention is to provide an electrically driven screw lift device that provides means for pivotally lifting a pickup truck cap or camper shell.

Another object of the present invention is to provide an electrically driven screw lift system that a standard camper shell is mounted to the bed of a pickup truck and the shell is hinged on the drivers side of the truck. Before use, the hold down fasteners are released on the passenger side of the truck freeing the cap to be pivotally maneuvered thereon.

Still yet another object of the present invention is to provide an electrically driven screw lift system that a 12 volt screw linear actuator is mounted to the pickup truck and to the camper shell and provides positive lift and retraction when activated.

Another object of the present invention is to provide an electrically driven screw lift system that the actuator lifts the complete camper shell on the hinges making the pickup truck bed accessible from the passenger side of the bed.

Yet another object of the present invention is to provide an electrically driven screw lift system that consists of a camper shell mounting bracket that mounts the actuator to the shell.

Additional objects of the present invention will appear as the description proceeds.

The present invention overcomes the shortcomings of the prior art by providing an electrically driven screw lift device that provides means for pivotally lifting a pickup truck cap or camper shell. A standard camper shell is mounted to the bed of a pickup truck and the shell is hinged on one side of the truck. Before use, the hold down fasteners are released on the other side of the truck. A 12-volt screw linear actuator is mounted to the pickup truck and to the camper shell and provides positive lift and retraction when activated. The actuator lifts the complete camper shell on the hinges making the pickup truck bed accessible from the passenger side of the bed. When not in use, the hold down fasteners are locked in the down position. An advantage to side access is side loading of materials such as sand, gravel, soil and other loose materials that can be dumped into the side access by other vehicles. Other advantages include the maneuvered of large articles into the bed without a height problem, due to increased standing room and may be safely driven to its destination.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.

10 present invention
12 truck
14 camper shell
16 bed of truck
18 other vehicle
20 actuator
22 motor and gear
24 camper shell mounting bracket
26 screw gear
30 actuator mounting bracket
32 hole
34 hinge
36 angle bracket
38 mounting bolt for angle bracket
40 bolt
42 swivel joint
44 cap hold down means

DETAILED DESCRIPTION OF THE PREFERRED EMBODIMENT

The following discussion describes in detail one embodiment of the invention. This discussion should not be construed, however, as limiting the invention to those particular embodiments since practitioners skilled in the art will recognize numerous other embodiments as well. For a definition of the complete scope of the invention, the reader is directed to the appended claims.

Figure 1:
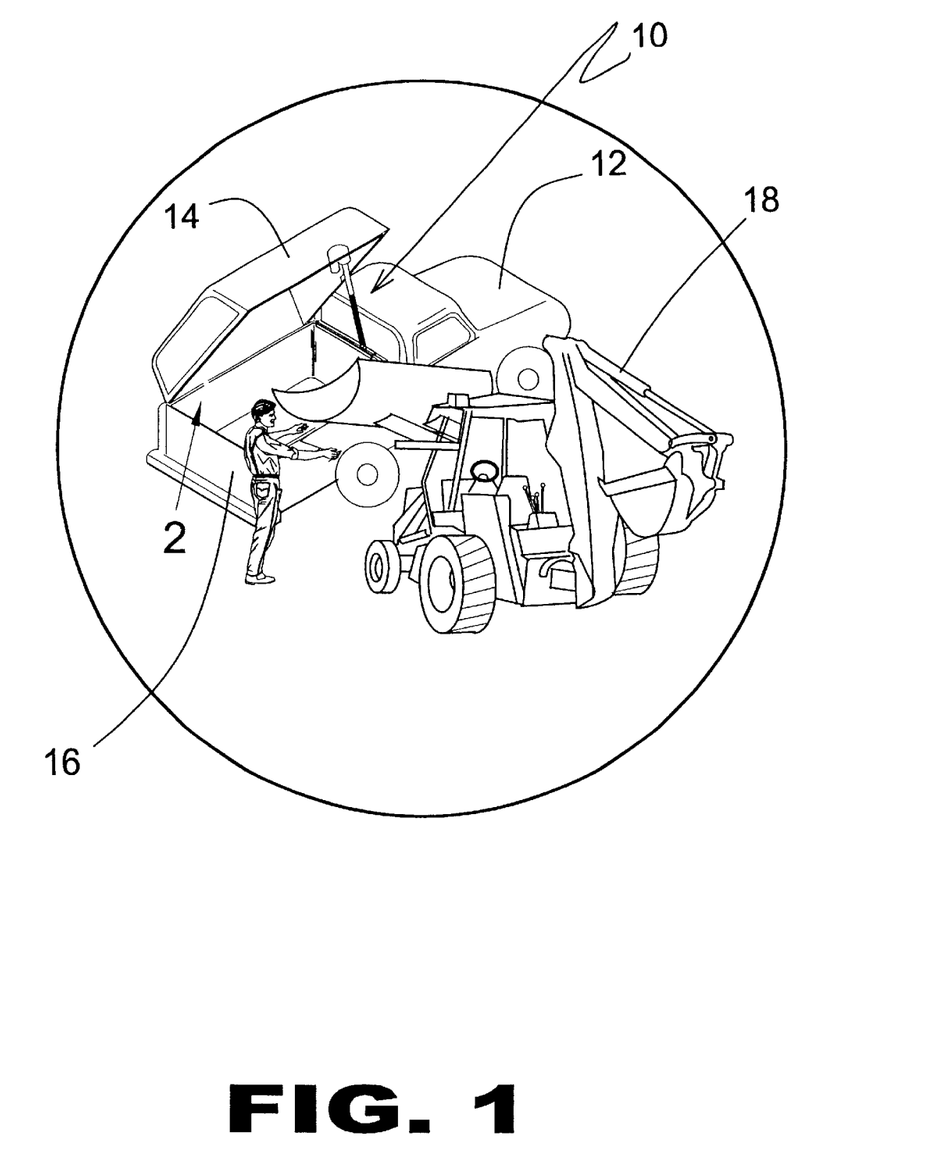
FIG. 1 is an illustrative view of the present invention in use.

Turning to FIG. 1, shown is an illustrative view of the present invention 10 in use. The present invention 10, an electrically driven screw lift device, provides means for pivotally lifting a pickup truck 12 cap or camper shell 14. As used, a standard camper shell 14 is mounted to the bed 16 of a pickup truck 12 and the shell 14 is hinged on one side of the truck. A 12-volt direct current screw linear actuator is mounted to the pickup truck 12 and to the camper shell 14 and provides positive lift and retraction when activated. The actuator lifts the complete camper shell 14 on the hinges making the pickup truck bed 16 accessible from the passenger side of the bed. An advantage to side access is side loading of materials such as sand, gravel, soil and other loose materials that can be dumped into the side access by other vehicles 18. Other advantages include maneuvering large articles into the bed 16 without a height problem, due to increased standing room so that the articles may be safely driven to their destination.

Figure 2:
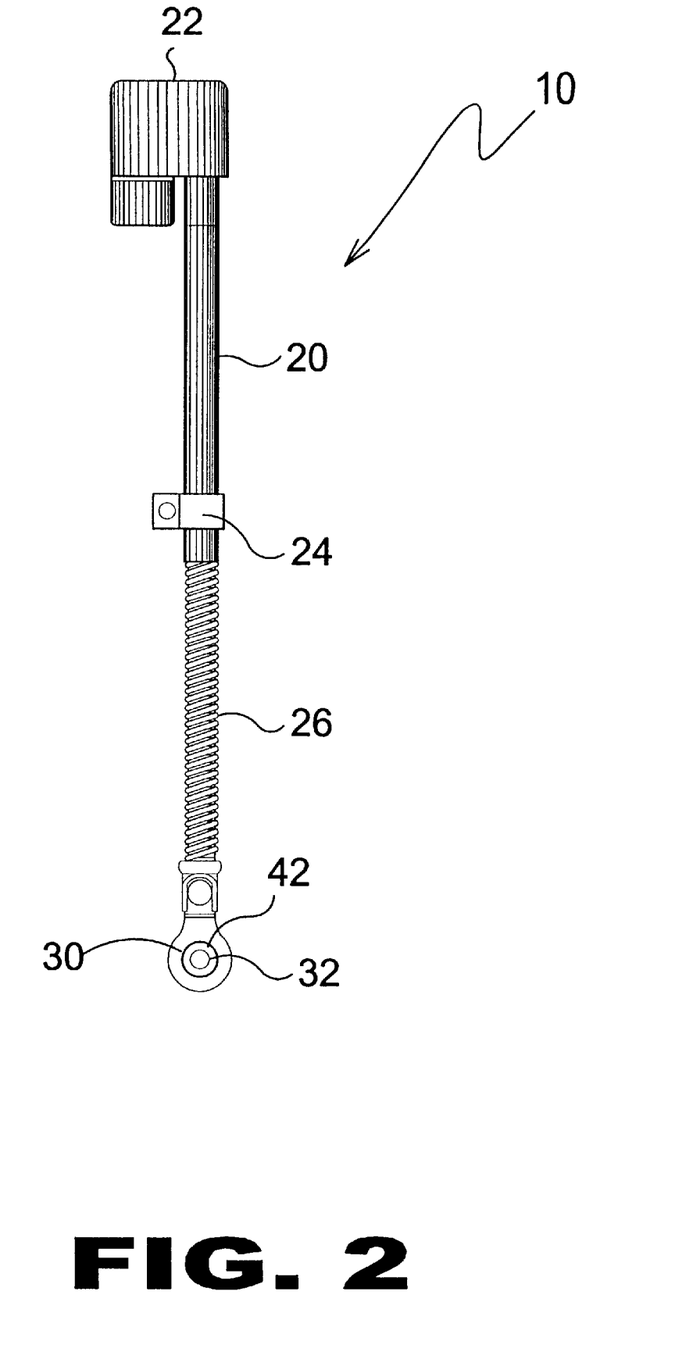
FIG. 2 is an orthographic view of the present invention.

Turning to FIG. 2, shown is an orthographic view of the present invention 10. Shown is the actuator 20 of the present invention 10, an electrically driven screw lift device, which provides means for pivotally lifting a pickup truck cap or camper shell. A 12-volt screw linear actuator 20 is mounted to the pickup truck's frame and to the camper shell and provides positive lift and retraction when activated. The actuator 20 lifts the complete camper shell on the hinges making the pickup truck bed accessible from the passenger side of the bed or from the rear of the truck. Shown are the motor and gear 22, camper shell mounting bracket 24, screw or worm gear 26, swivel joint 42, actuator mounting bracket 30 with hole 32 for receiving a bolt.

Figure 3:
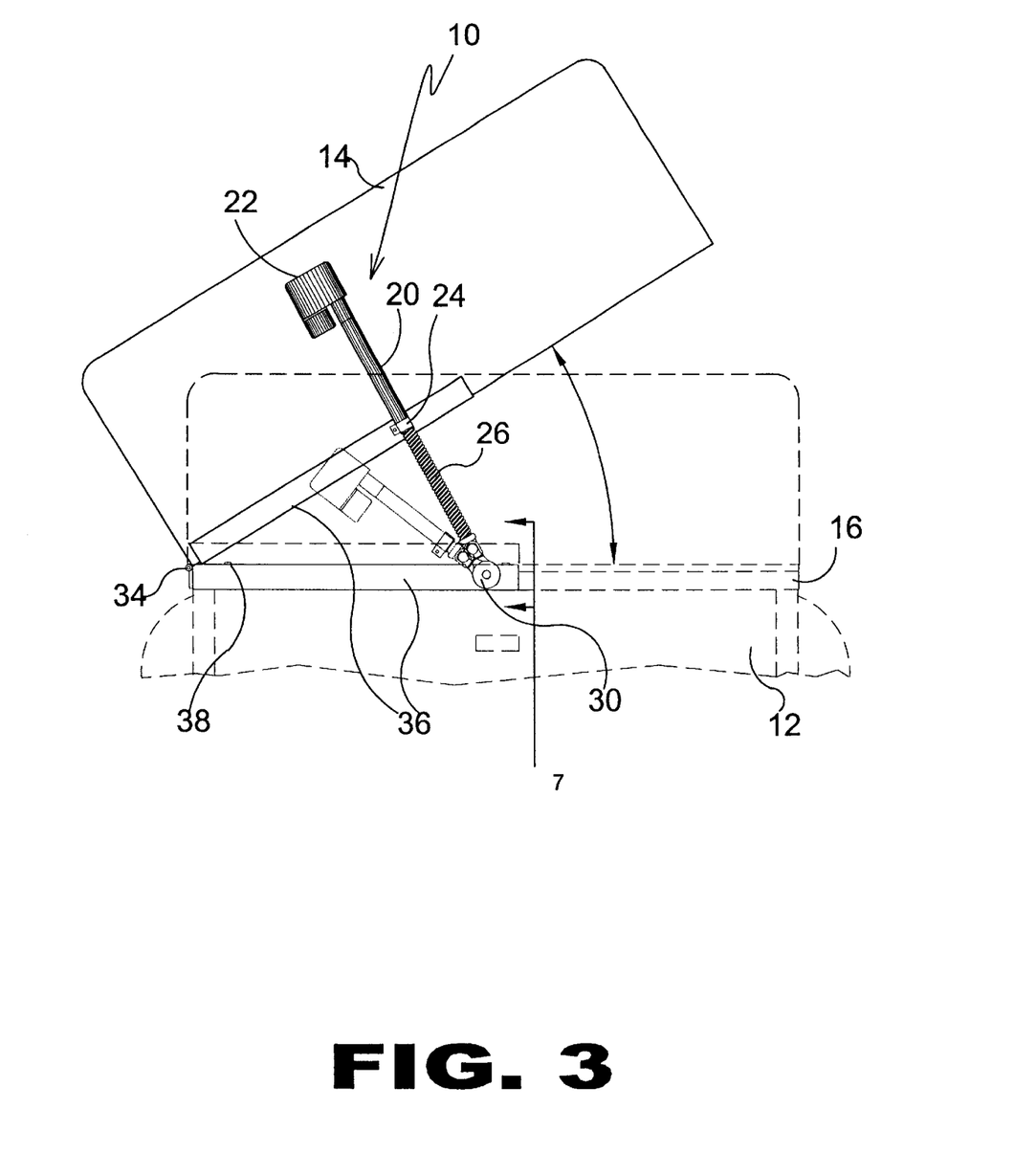
FIG. 3 is a rear functional view of the present invention.

Turning to FIG. 3, shown is a rear functional view of the present invention 10. Shown is a functional view of the present invention 10, an electrically driven screw lift device, which provides means for pivotally lifting a pickup truck cap or camper shell 14. As used, a standard camper shell 14 is mounted to the bed 16 of a pickup truck 12 and the shell is hinged at 34 on one side of the truck bed 16. One end of a 12-volt screw linear actuator 20 is mounted to the pickup truck 12 and the other end to the camper shell 14 so that the shell 14 is lifted when the actuator 20 is in the extended position and the shell 14 is lowered when the actuator 20 is in the retracted position. When actuator 20 is fully extended the screw gear 26 is fully extended and when actuator 20 is fully retracted the screw gear 26 is retracted into the housing of the actuator 20. The actuator 20 lifts the complete camper shell 14 on the hinges 34 making the pickup truck bed 16 accessible from the passenger side of the bed or from the rear of the truck. Also shown are the motor and gear 22, cap mounting bracket 24, screw gear 26, angle bracket 36, actuator mounting bracket 30, and angle bracket mounting bolt 38.

Figure 4:
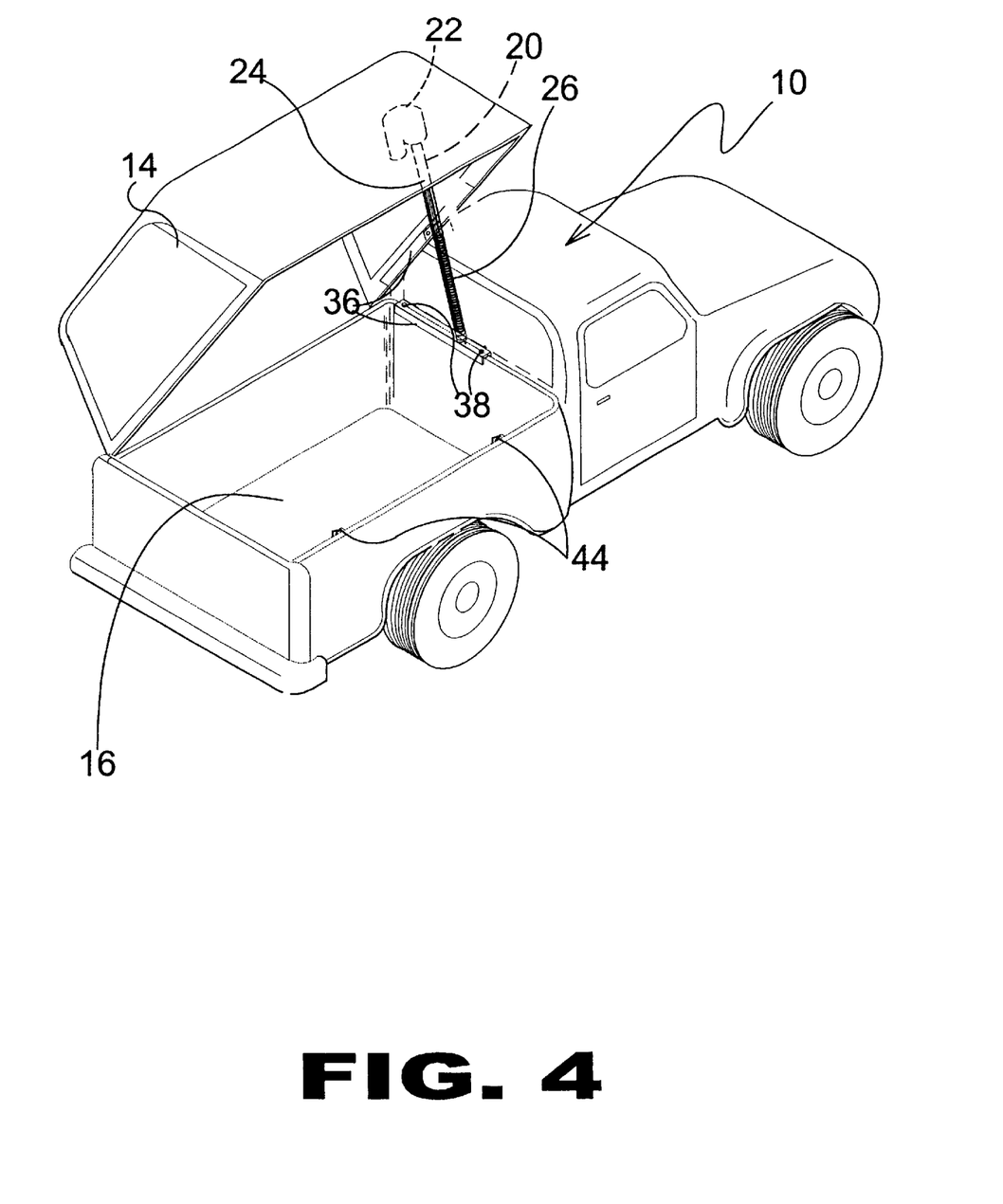
FIG. 4 is a perspective view of the present invention.

Turning to FIG. 4, shown is a perspective view of the present invention 10 in use. Shown is a perspective view of the present invention 10, an electrically driven screw lift device, which provides means for pivotally lifting a pickup truck cap or camper shell 14. As used, a standard camper shell 14 is mounted to the bed 16 of a pickup truck and the shell 14 is hinged on one side of the truck. A 12-volt screw linear actuator 20 is mounted to the pickup truck bed 16 and to the camper shell 14 and provides positive lift and retraction when activated. The actuator 20 lifts the complete camper shell 14 on the hinges making the pickup truck bed 16 accessible from the passenger side of the bed. An advantage to side access is side loading of materials such as sand, gravel, soil and other loose materials that can be dumped into the side access by other vehicles. Other advantages include the ability to maneuver large articles into the bed 16 without having a height problem due to increased standing room so that they may be safely driven to their destination. Also shown are the screw gear 26, motor and gear 22, cap mounting bracket 24, angle bracket 36 with bolts 38 and cap hold down means 44 including a latch member.

Figure 5:
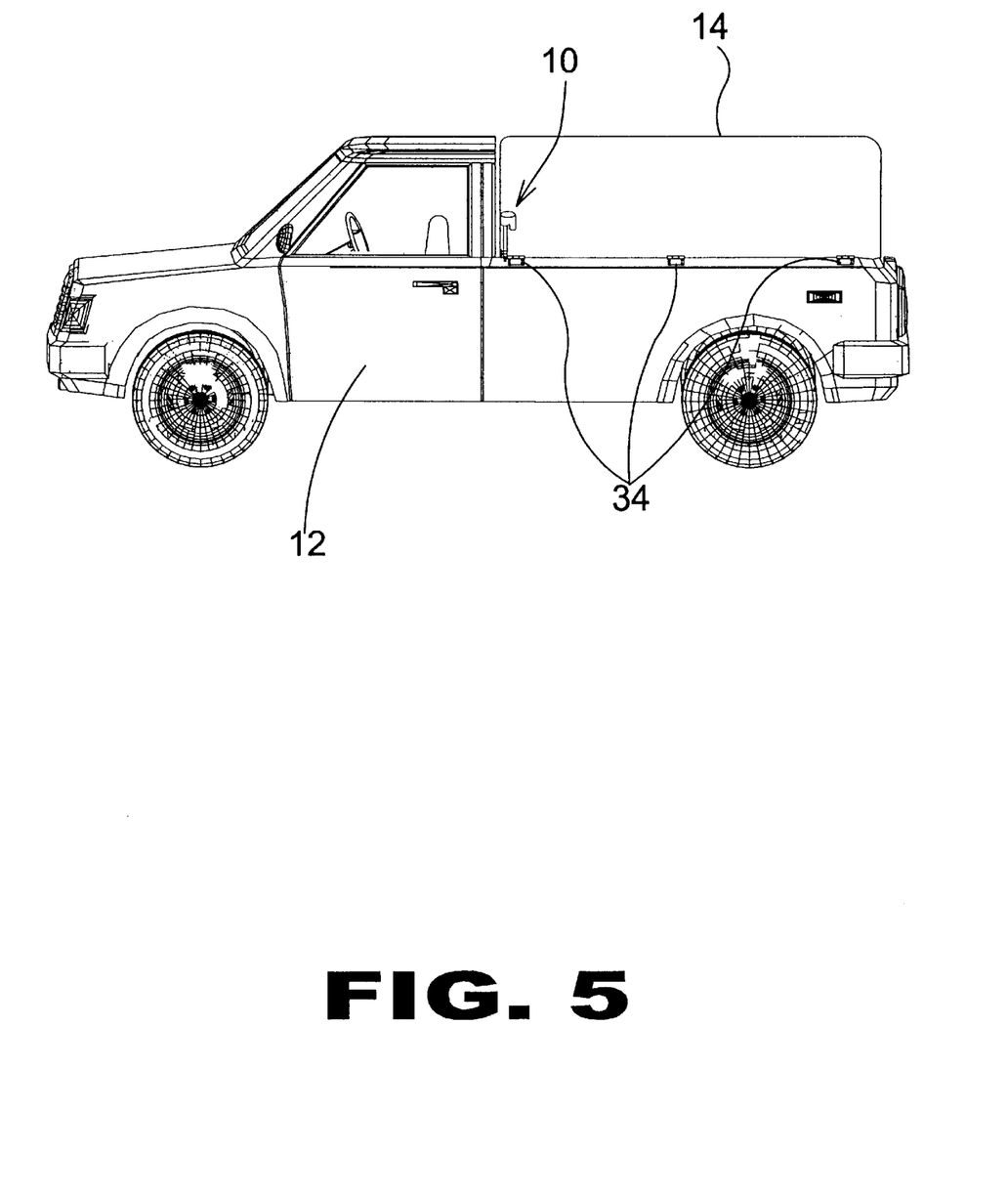
FIG. 5 is a side view of the present invention in use.

Turning to FIG. 5, shown is a side view of the present invention 10 in use. Shown is a side view of a pickup truck 12 using the device of the present invention 10. A plurality of hinges 34 provide means for pivotally moving the cap 14 while remaining secured to the truck while being pivoting.

Figure 6:
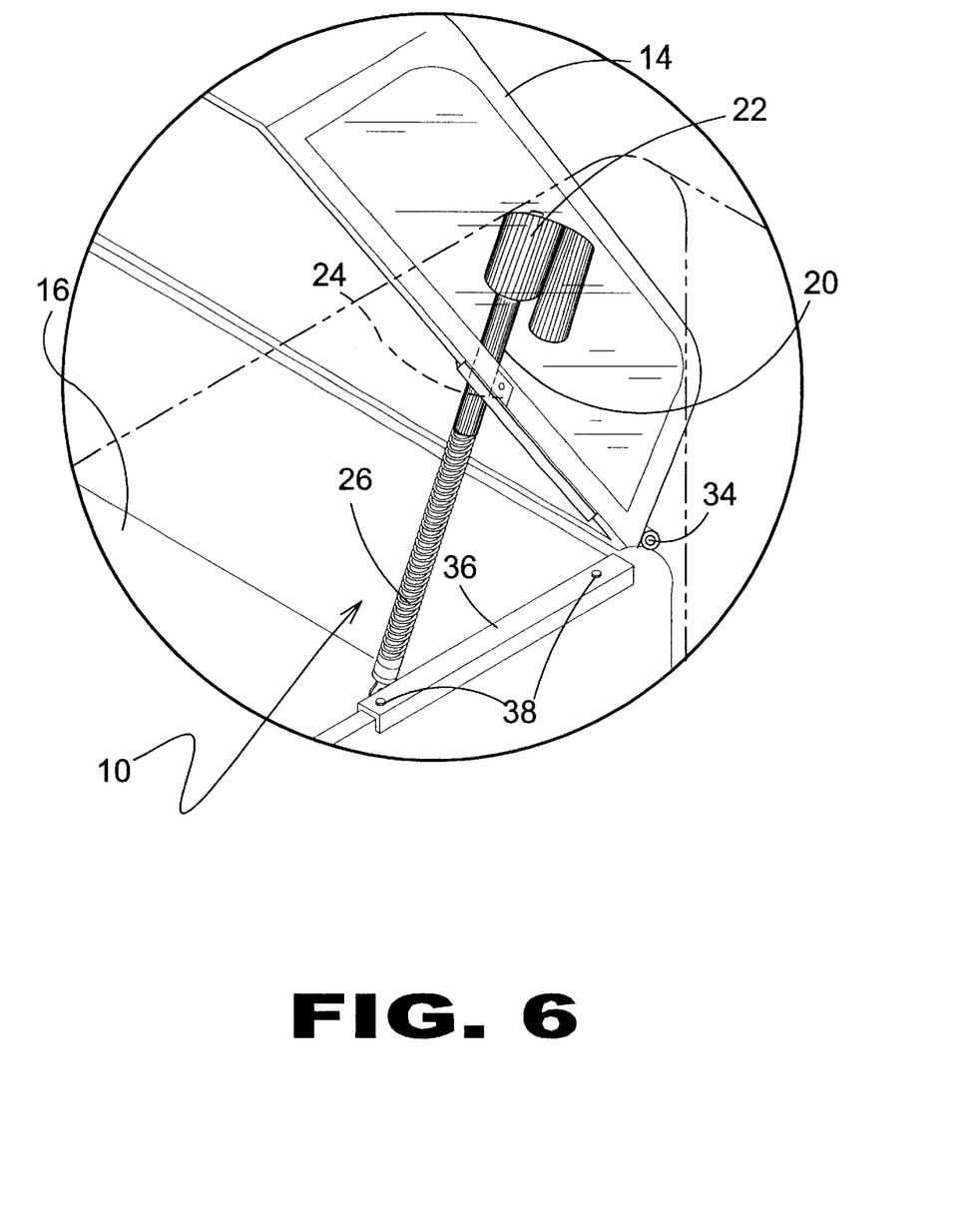
FIG. 6 is a detailed illustrative view of the present invention in use.

Turning to FIG. 6, shown is a detailed illustrative view of the present invention 10 in use. The present invention 10, an electrically driven screw lift device, provides means for pivotally lifting a pickup truck cap or camper shell 14. As used, a standard camper shell 14 is mounted to the bed 16 of a pickup truck and the shell 14 is hinged at 34 on the driver's side of the truck. A 12-volt screw linear actuator 20 is mounted to the pickup truck bed 16 and to the camper shell 14 and provides positive lift and retraction when activated. The actuator 20 lifts the complete camper shell 14 on the hinges 34 making the pickup truck bed 16 accessible from the passenger side of the bed. An advantage to side access is for side loading of materials such as sand, gravel, soil and other loose materials that can be dumped into the side access by other vehicles. Other advantages include the ability to maneuver large articles into the bed 16 without a height problem, due to increased standing room so that they may be safely driven to their destination. Also shown is the angle bracket 36 mounted onto the top edge of bed 16 having multiple bolts 38 for attachment thereto. Also shown are the motor and gear 22, cap mounting bracket 24 and screw gear 26.

Figure 7:
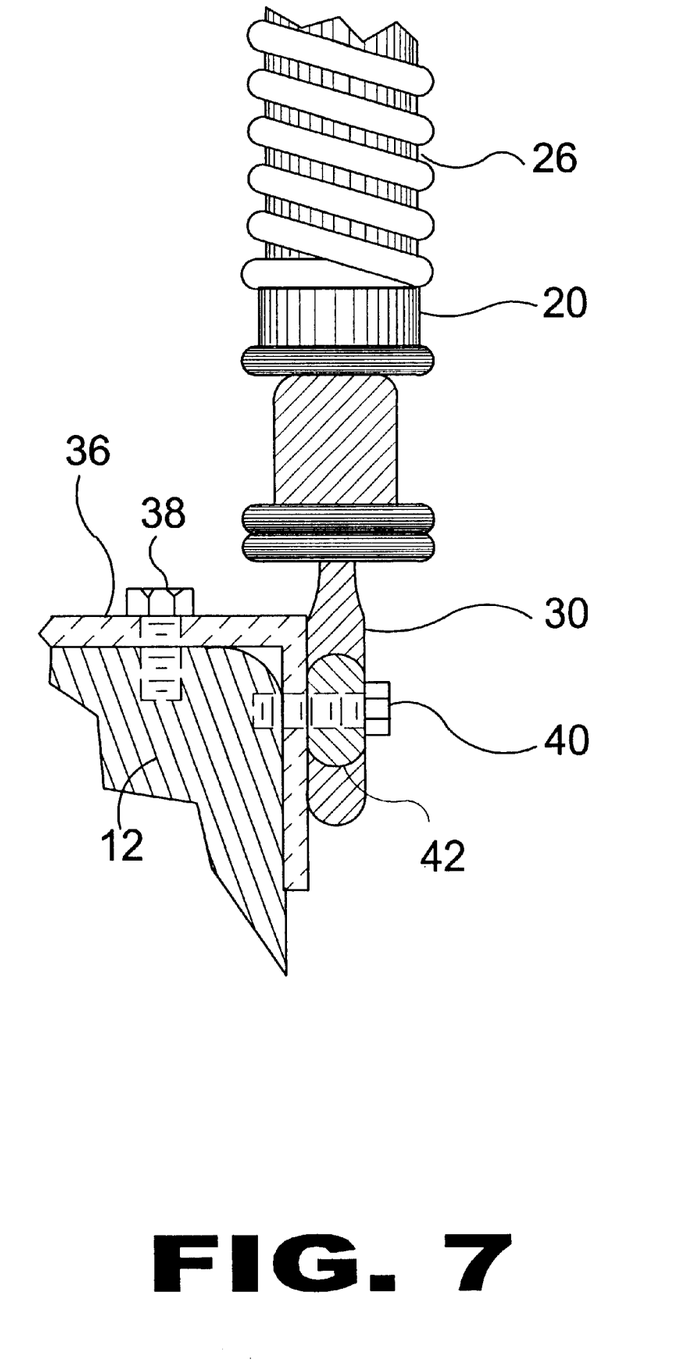
FIG. 7 is a partial sectional view of the present invention.

Turning to FIG. 7, shown is a partial sectional view of the present invention. The present invention, an electrically driven screw lift device, provides means for pivotally lifting a pickup truck cap or camper shell. Shown is a means for operating or lifting a standard camper shell mounted to the bed of a pickup truck 12. A 12-volt screw linear actuator 20 is mounted to the pickup truck 12 and to the camper shell and provides positive lift and retraction when activated. The actuator 20 lifts the complete camper shell on the hinges making the pickup truck 12 bed accessible from the passenger side of the bed. Also shown are the screw gear 26, actuator mounting bracket 30 with mounting bolt 40, angle bracket 36 with mounting bolt 38, and swivel joint 42.

What is claimed to be new and desired to be protected by Letters Patent is set forth in the appended claims.

I claim:

1. An apparatus for lifting one side of a camper shell attached to the bed of a pickup truck comprising:

a) a pick up truck having a bed disposed thereon, said bed having a front, a rear and pair of sides, said bed having upstanding walls disposed on said front and sides of said bed, said walls having a top edge thereon;

b) a camper shell disposed on said bed of said pickup truck, said shell having a front, a rear and pair of sides with a bottom edge and a top;

c) a plurality of hinges pivotally connecting one side of said shell to one side of said bed of said pickup truck to permit one side of the camper shell to be lifted so that articles can be side loaded into the bed of the pickup truck;

d) a means for lifting one side of the camper shell whereby one side of the camper shell is lifted so that the bed of the pickup truck can be accessed e) said lifting means comprising an electrical actuator having a housing, said housing having an upper end and a lower end, and an internal screw gear;

f) a motor and gear assembly disposed on the upper end of said actuator housing to extend and retract the screw gear, said screw gear extending out from the lower end of said housing, wherein said screw gear moves in and out of said actuator housing in response to operation of said motor and gear assembly, said screw gear terminating in an exposed end outside of said housing;

g) a connector for attaching the lower end of said housing to a first bracket mounted on the bottom edge of said camper shell, said motor and gear assembly being within said camper shell;

h) a second bracket mounted on a top edge of a rear upstanding wall of said bed, said second bracket being directly opposite said first bracket; and i) means including an actuator mounting bracket on the exposed end of said screw gear for attaching the exposed end of said screw gear to said second bracket to permit one side of said camper shell to be raised or lowered in response to movement of the screw gear.

2. The apparatus of claim 1, wherein said second bracket is an angle bracket, said angle bracket having a plurality of spaced apart holes therein for receiving a corresponding bolt.

3. The apparatus of claim 2, further comprising a plurality of spaced apart bolts for connecting said angle bracket to said wall of said bed of said pickup truck, wherein said bolts extend through said holes of said angle bracket to permit attachment of the angle bracket to the bed of the pickup truck.

4. The apparatus of claim 3, wherein the means attaching the exposed end of said screw gear to said second bracket comprises a bolt for attaching said actuator mounting bracket to said angle bracket wherein said bolt extends through a hole in said actuator mounting bracket.

5. The apparatus of claim 4 further comprising a swivel joint disposed around said bolt in said actuator mounting bracket to permit the actuator mounting bracket to swivel about the bolt therein.

6. The apparatus of claim 5, wherein said motor disposed in said housing of said actuator is a twelve-volt direct current motor to permit operation by connection to the electrical system of the pickup truck.

7. The apparatus of claim 6, wherein said first bracket has a base wherein said first bracket swivels about said base to permit said lifting means to swivel as it operates.

8. The apparatus of claim 7, further comprising a means for holding down said side of said camper shell opposite said hinges whereby the camper shell can be secured to the bed of the pickup truck.

9. The apparatus of claim 8, wherein said means for holding down said side of said camper shell comprises a latch member to permit the camper shell to be secured to the bed of the pickup truck.

* * * * *